US012098830B1

(12) United States Patent
Wei

(10) Patent No.: US 12,098,830 B1
(45) Date of Patent: Sep. 24, 2024

(54) INDUSTRIAL AND MINING LAMP THAT CAN BE ROTATED AND ADJUSTED FROM MULTIPLE ANGLES

(71) Applicant: Junmin Wei, Shenzhen (CN)

(72) Inventor: Junmin Wei, Shenzhen (CN)

( * ) Notice: Subject to any disclaimer, the term of this patent is extended or adjusted under 35 U.S.C. 154(b) by 0 days.

(21) Appl. No.: 18/609,540

(22) Filed: Mar. 19, 2024

(30) Foreign Application Priority Data

Feb. 2, 2024 (CN) ........................ 202420259419.8

(51) Int. Cl.
*F21V 21/30* (2006.01)
*F21V 17/12* (2006.01)
*F21W 131/40* (2006.01)

(52) U.S. Cl.
CPC .............. *F21V 21/30* (2013.01); *F21V 17/12* (2013.01); *F21W 2131/40* (2013.01)

(58) Field of Classification Search
CPC .......... F21V 21/30; F21V 17/02; F21V 17/06; F21V 19/02
See application file for complete search history.

(56) References Cited

U.S. PATENT DOCUMENTS 10,837,623 B1 * 11/2020 Tsao ........................ F21V 14/02
11,818,992 B1 * 11/2023 Luo ......................... F21V 21/30
2003/0227772 A1 * 12/2003 Yoshida .................. F21V 21/30 362/147
2009/0109670 A1 * 4/2009 Boyer ..................... F21V 17/02 362/253
2012/0300460 A1 * 11/2012 Liu ......................... F21V 19/02 362/249.02
2014/0168946 A1 * 6/2014 Kaplan ................... A63J 5/023 362/96
2018/0320870 A1 * 11/2018 Antony ................... F21S 8/026

FOREIGN PATENT DOCUMENTS

CN 214468172 U 10/2021

* cited by examiner

*Primary Examiner* — Eric T Eide
(74) *Attorney, Agent, or Firm* — Jeenam Park

(57) ABSTRACT

An industrial and mining lamp that can be rotated and adjusted from multiple angles is provided. Which includes a lamp frame and two sets of lamps provided on two transverse sides of the lamp frame and symmetrically distributed along an axis of the lamp frame. Two longitudinal sides of the lamp frame are provided an end cover, the two sets of lamps are respectively connected to the end cover through a rotating component along two longitudinal ends. The rotating component includes a screw, a limit ring, an iron ring, and a connector, the iron ring extends towards a circular groove direction and is provided with a toggle hook matching a convex bar, the rotating component in the present disclosure connects the end cover and the lamp. The rotating component can rotate the lamp from multi angle and achieve lighting in multi angle.

7 Claims, 6 Drawing Sheets

INDUSTRIAL AND MINING LAMP THAT CAN BE ROTATED AND ADJUSTED FROM MULTIPLE ANGLES

CROSS-REFERENCE TO RELATED APPLICATIONS

This application claims priority to Chinese Patent Application No. 202420259419.8, filed on Feb. 2, 2024, which is hereby incorporated by reference in its entirety.

TECHNICAL FIELD

The present disclosure relates to the field of lamps technologies, and in particular, to an industrial and mining lamp that can be rotated and adjusted from multiple angles.

BACKGROUND

The illumination angle of a lamp is also called as beam angle, refers to an angle formed between a main axis with strongest light source intensity and a position with 50% luminous intensity on two sides. It determines range and intensity of lighting and has a significant impact on lighting effect, so some multi-angle-adjustment lamps have appeared on the market.

A lamp with a rotatable lamp body at two-sides (publication number: CN214468172U, published on Oct. 22, 2021) includes a drive mechanism, a luminous lamp body, and a connection mechanism. Two sets of luminous lamp bodies are provided, the two sets of luminous lamp bodies are provided on two sides of the drive mechanism, a length of the luminous lamp body is the same as that of the drive mechanism. Two sets of connection mechanisms are provided, the two sets of connection mechanisms are provided at two ends of the drive mechanism, the luminous body is rotatably connected to the connection mechanism, the connection mechanism includes an end cover, a first connector, and a second connector. Two ends of the luminous body are provided with a threaded hole, the end cover is connected to the threaded hole of the luminous body through the second connector.

The luminous body of the lamp is connected to the end cover through the second connector and an plug piece. The two sets of luminous bodies can rotate relative to the end cover, a requirement of illumination angle in a special circumstance can be achieved. However, the lamp does not have a clear rotation range for the luminous body, can not to accurately determine a required rotation angle for the luminous body, and this lamp lacks relevant technology for judgment and explanation.

SUMMARY

In response to the technical defects in the background technology, the present disclosure proposes an industrial and mining lamp that can be rotated and adjusted from multiple angles, which solves the above technical problems and meets a practical need. The specific technical solution is as follows.

An industrial and mining lamp that can be rotated and adjusted from multiple angles, which has a longitudinal direction corresponding to its own length direction and a transverse direction orthogonal to the longitudinal direction, the industrial and mining lamp includes: a lamp frame and two sets of lamps provided on two transverse sides of the lamp frame and symmetrically distributed along an axis of the lamp frame, the lamp frame is provided with an end cover along two longitudinal sides, the two sets of lamps are respectively connected to the end cover through a rotating component along two longitudinal ends;

the rotating component includes a screw, a limit ring, an iron ring, and a connector, the connector is fixed on one side of the end cover near the lamp, one side of the lamp that is closely attached to the connector is provided with a circular groove matching with a convex ring, a center position of the circular groove is provided with a circular hole, the limit ring is provided on one side of the connector away from the lamp, a center of the limit ring is provided with a first hole matching with the screw, the screw passes through the first hole and is connected to the lamp through the circular hole;

one end the connector near the end cover is provided with a limit block matching with the limit ring, the circular groove is provided with several convex bars that are evenly distributed along its own center towards an edge direction, the iron ring is sleeved on the screw and provided between the convex ring and the circular groove; the iron ring extends towards a direction of the circular groove and is provided with a toggle hook that matches the convex bars.

In an embodiment of the present disclosure, the convex ring includes a large circular ring provided on an outer side and a small circular ring provided on an inner side, a center of the small circular ring is provided with a second hole that matches the screw, one end of the small circular ring near the connector is provided with a first placement groove, the iron ring is provided in the first placement groove, a side of the small circular ring is provided with a second placement groove, the toggle hook is provided on the second placement groove.

In an embodiment of the present disclosure, one end of the screw near the end cover is provided with a screw head, the screw head is provided on one side of the limit ring away from a connection block, one end of the screw away from the end cover passes through the second hole and is provided in the lamp, one side of a lamp housing away from the connector is provided with a bolt, the bolt is sleeved on the screw.

In an embodiment of the present disclosure, thirty-six convex bars are provided, the thirty-six convex bars divide the circular groove into thirty-six movable areas, an angle of each movable area is 10°.

In an embodiment of the present disclosure, cross-sections of the first hole, the second hole, and the screw are a closed pattern that is connected by two straight lines and two circular arcs in a staggered manner.

In an embodiment of the present disclosure, the lamp includes the lamp housing, a substrate, a light source board, and a lamp cover provided at the two longitudinal ends of the lamp, the light source board is provided between the lamp housing and the substrate, the convex ring is provided at one end of the lamp cover away from the lamp housing.

In an embodiment of the present disclosure, the lamp frame includes a frame body, a top plate, and a drive component, the drive component is provided between the frame body and the top plate, two longitudinal ends of the frame body are fixed on the end cover.

The beneficial effects of the present disclosure are:

The present disclosure adopts a rotating component to connect the end cover and the lamp. The rotating component can achieve to rotate the lamp from multi angles and achieve lighting form multi angles. The lamp is provided with two sets of lamp frames that are symmetrically distributed, the rotating component is provided at two ends of each lamp to maintain stability during a rotation process, thereby avoiding a phenomenon of tilting or shaking caused by a deviation of the gravity center. The rotating component of the present disclosure includes a screw, a limit ring, an iron ring, and a connector, which passes through a first hole and is connected to the lamp through a circular hole, thereby ensuring that the lamp will not loosen or fall off during the rotation process and can rotate smoothly.

The present disclosure adopts a combination of convex bars and toggle hook to achieve step-by-step rotation of the lamp, thereby achieving a precise control of lighting angle. The lamp can maintain stability at each step position, ensuring a durability and reliability of lighting effect, and reducing a movement of the lamp caused by an accidental touch or external interference.

Figure 1:
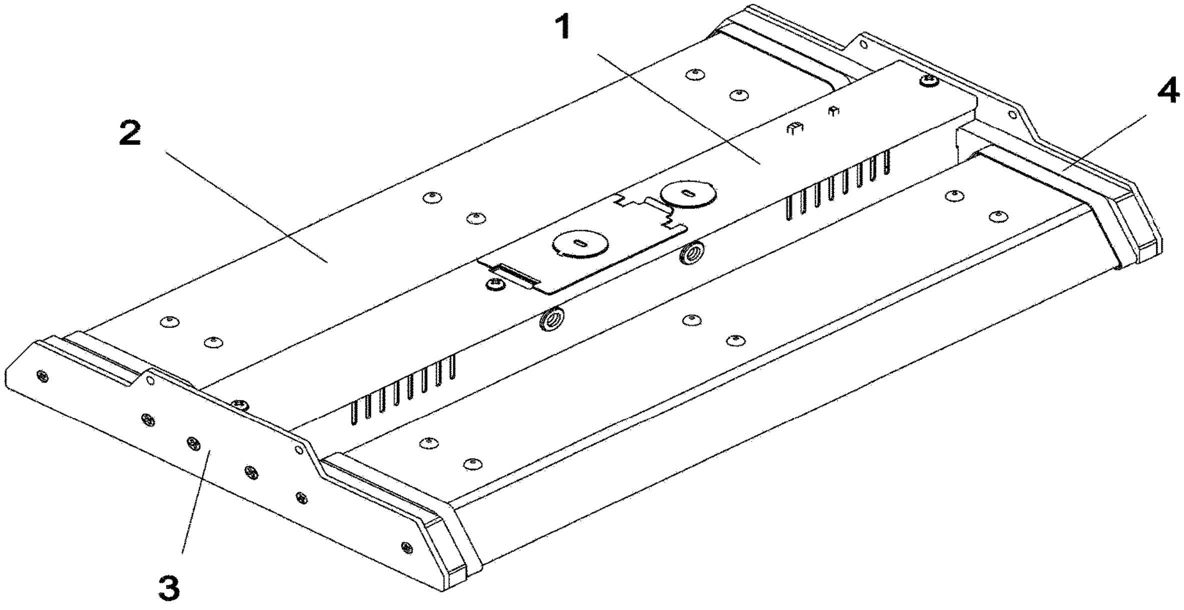
FIG. 1 is a structural diagram of an industrial and mining lamp that can be rotated and adjusted from multiple angles.

Numeral reference: lamp frame 1, frame body 11, top plate 12, lamp 2, lamp housing 21, base plate 22, lamp cover 24, convex ring 25, large circular ring 251, small circular ring 252, second hole 253, end cover 3, rotating component 4, screw 41, bolt 411, limit ring 42, first hole 421, iron ring 43, toggle hook 431, connector 44, circular groove 441, limit block 442, convex bar 443.

DESCRIPTION OF EMBODIMENTS

The following is an explanation of the embodiments of the present disclosure, combined with FIGS. 1-6 and relevant embodiments. The embodiments of the present disclosure not limited to the following embodiments, and the necessary components related to the present technical field should be considered as well-known technology in the present technical field, which can be known and mastered by those skilled in the art.

Industrial and mining lamp refers to a general term for two types of lamps used in production and operation area of factory, mine, warehouse, and high shed. In addition to various lighting lamps used in a normal environment, there are also explosion-proof lamp and anti-corrosion lamp used in a special environment. The existing industrial and mining lights do not have a guiding function, people are prone to getting lost when searching for and rescuing personnel or escaping in mines with many forks, searching or exploring forests with many forks at night, and searching and rescuing after exploring in desert at night.

Figure 2:
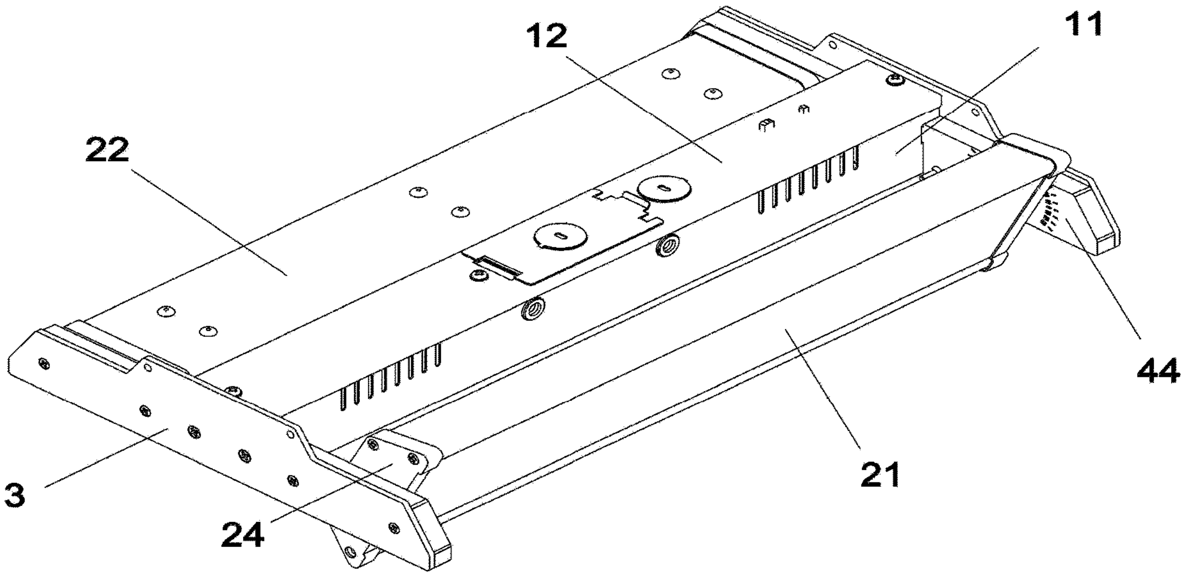
FIG. 2 shows a use state of the industrial and mining lamp that can be rotated and adjusted from multiple angles.

The present disclosure provides an industrial and mining lamp that can be rotated and adjusted from multiple angles, as shown in FIG. 1. It has a longitudinal direction corresponding to its own length direction and a transverse direction orthogonal to the longitudinal direction, the industrial and mining lamp includes a lamp frame 1 and two sets of lamps 2 provided on two transverse sides of the lamp frame 1 and symmetrically distributed along an axis of the lamp frame 1. As shown in FIG. 2, the lamp frame 1 is provided with an end cover 3 on both longitudinal sides, the two sets of lamps 2 are connected to the end cover 3 through a rotating component 4 on two longitudinal ends. The present disclosure adopts the rotating component 4 to connect the end cover 3 and the lamp 2. The rotating component 4 can achieve rotating the lamp 2 in multi angles, achieving illumination in multi angles. Two set of lamps 2 are provided and symmetrically distributed along the lamp frame 1. The rotating component 4 is provided at two ends of each lamp 2, ensuring that the lamp 2 remains stable during rotation and avoiding tilting or shaking caused by a deviation of the gravity center.

Figure 3:
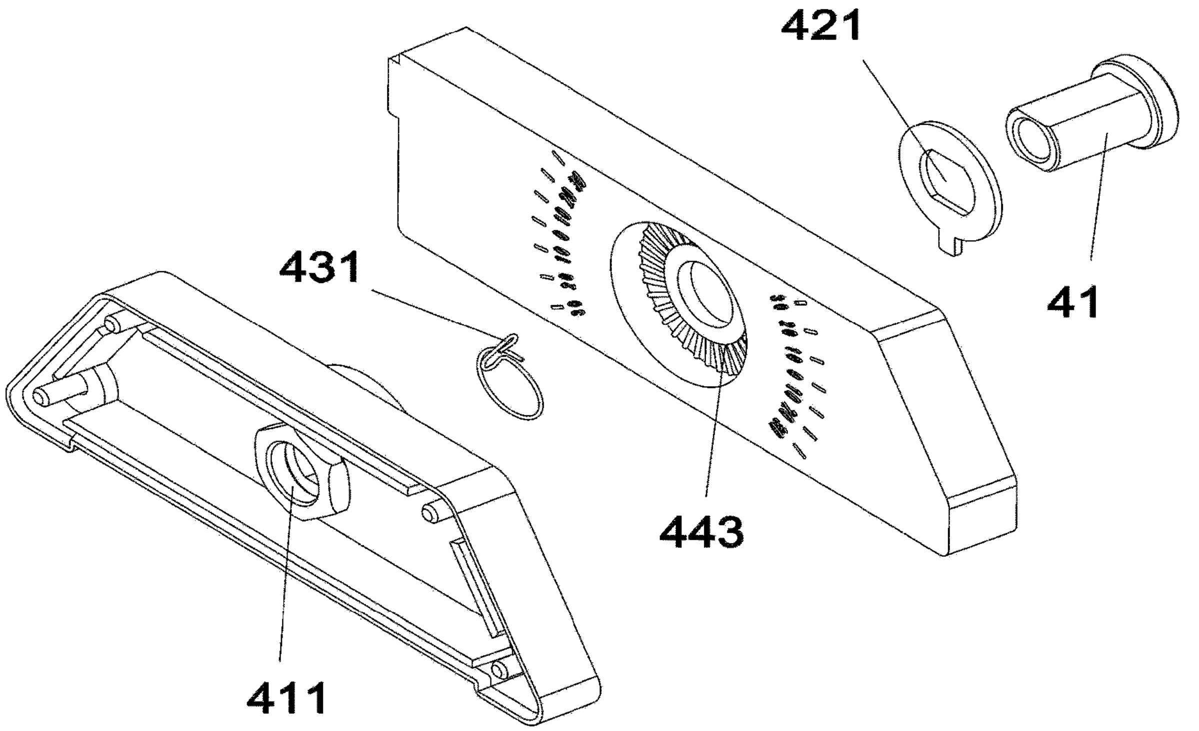
FIG. 3 is a structural diagram of a rotating component of the industrial and mining lamp that can be rotated and adjusted from multiple angles.

As shown in FIG. 3, the rotating component 4 includes a screw 41, a limit ring 42, an iron ring 43, and a connector 44. The connector 44 is fixed on one side of the lamp 2 near the end cover 3. One side of the lamp 2 near the connector 44 is respectively provided with a circular groove 441 matching with a convex ring 25. A center position of the circular groove 441 is provided with a circular hole, the limit ring 42 is provided on one side of the connector 44 far from the lamp 2. A center of the limit ring 42 is provided with a first hole 421 that matches the screw 41, the screw 41 passes through the first hole 421 and is connected to the circular hole and the lamp 2. The rotating component 4 of the present disclosure includes the screw 41, limit ring 42, iron ring 43, and connector 44, which passes through the first hole 421 and is connected to the circular hole and the lamp 2, ensuring that the lamp 2 does not loosen or fall off during the rotation process and smoothly rotating.

Figure 4:
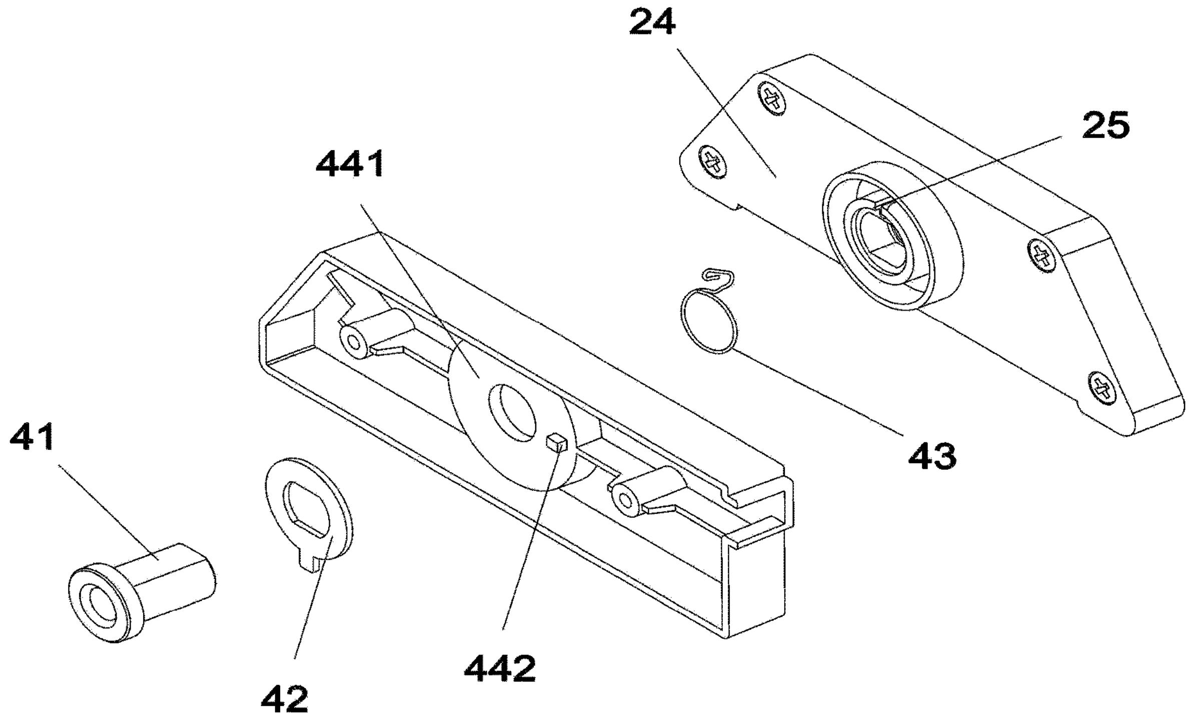
FIG. 4 is another angle structural diagram of the rotating component of the industrial and mining lamp that can be rotated and adjusted from multiple angles.

As shown in FIG. 4, FIG. 4 and FIG. 3 are structural diagrams at different angles in the same scene. FIGS. 3 and 4 both show the composition of rotating component 4. At one end of the connector 44 near the end cover 3, there is a limit block 442 that matches the limit ring 42. The circular groove 441 is provided with several convex bars 443 that are evenly distributed along its own center towards an edge direction. The iron ring 43 is sleeved on the screw 41 and placed between the convex ring 25 and the circular groove 441. The iron ring 43 extends towards the circular groove 441 and is provided with a toggle hook 431 that matches the convex bar 443. The present disclosure adopts the combination of convex bar 443 and toggle hook 431 to achieve rotating the lamp 2 step-by-step, thereby achieving a precise control of lighting angle. Thus, the lamp 2 can maintain stability at each step position, thereby ensuring the durability and reliability of the lighting effect, reducing a movement of the lamp 2 caused by an accidental touch or external interference.

The following are embodiments and comparative embodiment of the present disclosure.

EMBODIMENT

An industrial and mining lamp that can be rotated and adjusted from multiple angles, as shown in FIG. 1, it has a longitudinal direction corresponding to its own length and a transverse direction orthogonal to the longitudinal direction, and includes a lamp frame 1 and two sets of lamps 2 provided on two transverse sides of lamp frame 1 and symmetrically distributed along an axis of the lamp frame 1. By providing with two sets of lamps 2 that are symmetrically distributed along the lamp frame 1, dual-sided lamp 2 can evenly illuminate the space, avoiding problems of shadows and uneven lighting that may occur with single-sided lamp 2. Moreover, the dual-sided lamp 2 can independently control at one side, the industrial and mining environment is often variable, which may involve different positions such as indoor, outdoor, high and low. The independent control of dual-sided industrial and mining light allows users to adjust the lighting according to specific environmental and task requirements, enabling them to adapt to various complex and changeable work scenarios.

The lamp frame 1 is provided with an end cover 3 on two longitudinal sides, two sets of lamps 2 are connected to the end cover 3 through a rotating component 4 on two longitudinal ends. The rotating component 4 is used to connect the end cover 3 to the lamp 2, which can achieve rotating the lamp 2 in multi angles and achieve lighting in multi angles. The rotating component 4 is installed at two ends of each lamp 2 to maintain stability during rotation and avoid tilting or shaking caused by a deviation of gravity center.

As shown in FIG. 1, the lamp frame 1 includes a frame body 11, a top plate 12, and a drive component. The drive component is located between the frame body 11 and the top plate 12, two longitudinal ends of the frame body 11 are fixed on the end cover 3. The lamp 2 includes a lamp housing 21, a base plate 22, a light source board, and a lamp cover 24 located at the longitudinal end of lamp 2. The light source board is located between the lamp housing 21 and the base plate 22. The drive component includes a power cord connected to an outside world and drives the power board light. The drive component is connected to the light source board through the power cord and supplies power to the LED light of the light source board.

As shown in FIGS. 3 and 4, the rotating component 4 includes a screw 41, a limit ring 42, an iron ring 43, and a connector 44. The connector 44 is fixed on one side of the end cover 3 near the lamp 2, the limit ring 42 is provided on one side of the connector 44 away from the lamp 2. One end of the connector 44 near the end cover 3 is provided with a limit block 442 that matches the limit ring 42. The combination of the limit block 442 and the limit ring 42 limits the rotation angle of the lamp 2 to prevent the lamp 2 from rotating multiple times and the cord from getting entangled or broken during the rotation process.

One side of the lamp 2 that is closely attached to the connector 44 is provided with a circular groove 441 matching with a convex ring 25. The convex ring 25 is located at one end of the lamp cover 24 away from the lamp housing 21. A center position of the circular groove 441 is provided with a circular hole, the iron ring 43 is sleeved on the screw 41 and is provided between the convex ring 25 and the circular groove 441. A center of the limit ring 42 is provided with a first hole 421 that matches the screw 41. The screw 41 passes through the first hole 421 and the circular hole and is connected to the lamp 2 to ensure that the lamp 2 will not loosen or fall off during rotation and can still rotate smoothly after long-term use.

The convex ring 25 includes a large circular ring 251 provided on an outer side and a small circular ring 252 provided on an inner side. The size of the large circular ring 251 matches that of the circular groove 441, rendering the lamp cover 24 to be more tightly connected to the connector 44 and allowing the large circular ring 251 to rotate within the circular groove 441. A center of the small circular ring 252 is provided with a second hole 253 that matches the screw 41. Cross-sections of the first hole 421, the second hole 253, and the screw 41 are a closed pattern that is connected by two straight lines and two circular arcs in a staggered manner. One end of the screw 41 near the end cover 3 is provided with a screw head, which is provided on one side of the limit ring 42 away from a connection block. One end of the screw 41 that is far away from the end cover 3 passes through the second hole 253 and is provided in the lamp 2. One side of the lamp housing 21 that is far away from the connector 44 is provided with a bolt 411, which is sleeved on the screw 41.

More specifically, the screw 41 passes through the second hole 253 of the limit ring 42, the circular hole of the connector 44, the iron ring 43, and the second hole 253 of the lamp cover 24 in sequence and is fixed to the bolt 411. The screw head and bolt 411 tightly connect the limit ring 42, the connector 44, and the lamp cover 24. Due to the fact that the cross-section of the first hole 421, the second hole 253, and the screw 41 is a closed pattern that is connected by two straight lines and two circular arcs, the lamp 2, the limit ring 42, and the screw 41 rotate together. However, the connector 44 has a circular hole, the screw 41 rotates in the circular hole, while the connector 44 does not move together with the screw 41.

Figure 5:
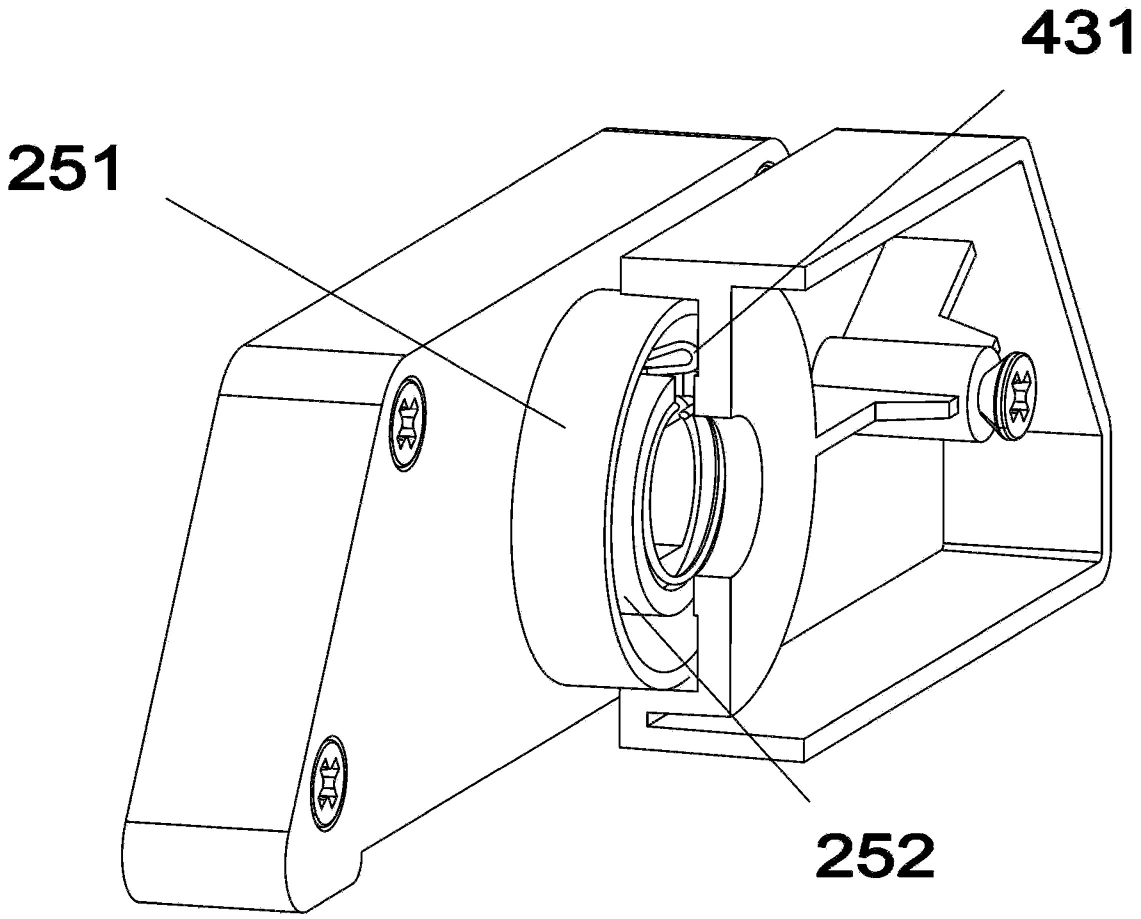
FIG. 5 is a connection structure between a toggle hook and a circular groove of the industrial and mining lamp that can be rotated and adjusted from multiple angles.
Figure 6:
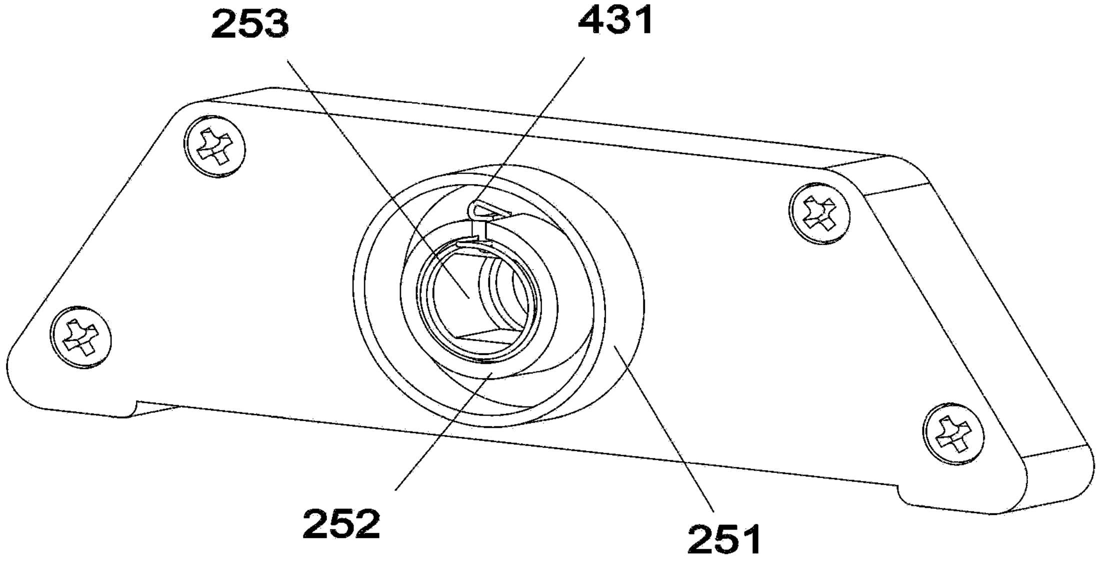
FIG. 6 is a structural diagram of a convex ring of the industrial and mining lamp that can be rotated and adjusted from multiple angles.

As shown in FIGS. 5 and 6, there are several convex bars 443 uniformly distributed along its center towards an edge of the circular groove 441. Thirty-six convex bars 443 are provided and which divide the circular groove 441 into thirty-six movable areas, an angle of each moveable area is 10°. The iron ring 43 extends towards the circular groove 441 and is provided with a toggle hook 431 that matches the convex bar 443. One end of the small circular ring 252 near the connector 44 is provided with a first placement groove, the iron ring 43 is placed in the first placement groove, one side of the small circular ring 252 is provided with a second placement groove, and the toggle hook 431 is placed in the second placement groove.

The iron ring 43 and the toggle hook 431 are placed on the small circular ring 252, so the iron ring 43 and the toggle hook 431 move together with the rotation of the lamp 2, and the toggle hook 431 cooperates with the convex bar 443. At the same time, the connector 44 remains stationary. When rotating the lamp 2, the toggle hook 431 rotates one step to be got stuck between two convex bars 443. The angle of each movable area is 10°. When rotating one step, the rotation angle is 10°, thus, the lamp 2 can achieve a step-by-step rotation and a precise control of the lighting angle. The lamp 2 can maintain stability at each step position, ensuring the durability and reliability of the lighting effect, reducing the movement of lamp 2 caused by an accidental touch or external interference.

Comparative Embodiment

A dual-sided rotatable lamp body (public number: CN214468172U, published on Oct. 22, 2021) includes a drive mechanism, a luminous lamp body, and a connecting mechanism. The luminous lamp body is provided with two sets, two sets of the luminous lamp bodies are provided on two sides of the drive mechanism, a length of the luminous lamp body is the same as that of the drive mechanism. The connecting mechanism is provided with two sets, the two sets of connecting mechanisms are provided at two ends of the drive mechanism, the luminous body is rotatably connected to the connecting mechanism, the connecting mechanism specifically includes an end cover, a first connector, and a second connector. Two ends of the luminous body are provided with a threaded hole, the end cover is connected to the threaded hole of the luminous body through the second connector.

There is a plug piece on the end cover, and a through hole is provided on the plug piece. There is a corresponding through hole on the second connector, a groove is provided at a top of the second connector. The plug piece can be inserted into the groove, a bolt is provided. The bolt sequentially passes through the through hole on the second connector and the through hole on the plug piece and extends from the other end of the second connector. A part where the bolt extends from the second connector is threaded with the threaded hole on the luminous body. One end of the second connector near the luminous body is provided with a first gear group, an outer side of the threaded hole of the luminous body is also provided with a second gear group. The first gear group and second gear group are interlocked to limit the sliding of the lamp body when it rotates.

There are a first baffle and a second baffle on the end cover, the first baffle is used to place the luminous lamp body, the second baffle is provided with two circular holes, the first connector is correspondingly provided with two cylindrical holes. The bolt sequentially passes through the circular hole on the second baffle and the cylindrical hole on the first connector, and the bolt tightly abuts against a top of a surface cover. A bottom of the luminous body is provided with a lens, a top of the luminous body is provided with a heat sink, a wiring hole is provided on the luminous body. The drive mechanism includes the surface cover, a bottom plate, and a power supply. There are wire holes on two sides of the surface cover, the power supply is provided on the bottom plate. The bottom plate is detachably connected to the surface cover.

The specific implementation principle of this Comparative Embodiment is as follows: the plug piece is provided on the end cover, the plug piece is inserted into the groove of the second connector. The bolt is provided to pass through the plug piece and groove, the bolt is thread matched with the luminous lamp body. At this time, the luminous lamp body can rotate relative to the end cover. One section of the second connector near the luminous lamp body is provided with the first gear group, the outer side of the threaded hole of the luminous lamp body is provided with the second gear group. By setting the first gear group and the second tooth group, and the first tooth group and the second gear group two are interlocked, which can increase a friction between the luminous lamp body and the second connector, which effectively avoiding the sliding of the luminous lamp body after rotation.

In summary, the difference between the Comparative Embodiment and the embodiment can be drawn.

1. The end cover in the Comparative Embodiment is provided with the plug piece, the plug piece is inserted the groove of the second connector, the bolt is provided to pass through the plug piece and groove. The bolt is thread matched with the luminous body to meet the requirements of lighting angle in a special circumstance; the connection in the embodiment is achieved by the rotating component, because the screw itself can achieve full angle rotation within the circular hole of the connector, compared to the second connector, the screw of the rotating component can achieve a larger rotation angle.

2. The first gear group and second gear group provided in Comparative Embodiment increases the friction between the luminous lamp body and the second connector, which can effectively prevent the lamp body from sliding when rotating to a certain angle. The first gear group and second gear group play a fixed angle role; compared to the Comparative Embodiment, this embodiment uses a combination of convex bars and toggle hook to achieve step-by-step rotation of the lamp, thereby achieving a precise control of 10° rotation when rotating one step, and limit ring and limit block are set to limit the lamp's multiple rotations.

3. The plug piece in Comparative Embodiment is inserted into the second connector, the bolt is set to pass through the second connector and the plug piece in sequence, this connection way is more sturdy and stable in structure, and is not easily damaged. In this embodiment, the screw passes through the second hole of the limit ring, the circular hole of the connector, the iron ring, and the second hole of the lamp cover in sequence and is fixed to the bolt. The screw head and bolt tightly connect the limit ring, the connector, and the lamp cover. In this embodiment, the connector is used to connect the end cover and the lamp, thereby stabilizing the entire industrial and mining lamp. Compared to the Comparative Embodiment, the rotation way of the screw not only stabilizes the lamp but also ensures a smooth rotation of the lamp.

The above is only a preferred implementation of the present disclosure. It should be noted that for those skilled in this art, several improvements and embellishments can be made without departing from the principles of the present disclosure. These improvements and embellishments should also be considered as the protection scope of the present disclosure.

What is claimed is:

1. An industrial and mining lamp that can be rotated and adjusted from multiple angles, which has a longitudinal direction corresponding to its own length direction and a transverse direction orthogonal to the longitudinal direction, wherein the industrial and mining lamp comprises: a lamp frame and two sets of lamps provided on two transverse sides of the lamp frame and symmetrically distributed along an axis of the lamp frame, the lamp frame is provided with an end cover along two longitudinal sides, the two sets of lamps are respectively connected to the end cover through a rotating component along two longitudinal ends;

the rotating component comprises a screw, a limit ring, an iron ring, and a connector, the connector is fixed on one side of the end cover near the lamp, one side of the lamp that is closely attached to the connector is provided with a circular groove matching with a convex ring, a center position of the circular groove is provided with a circular hole, the limit ring is provided on one side of the connector away from the lamp, a center of the limit ring is provided with a first hole matching with the screw, the screw passes through the first hole and is connected to the lamp through the circular hole;

one end the connector near the end cover is provided with a limit block matching with the limit ring, the circular groove is provided with several convex bars that are evenly distributed along its own center towards an edge direction, the iron ring is sleeved on the screw and provided between the convex ring and the circular groove; the iron ring extends towards a direction of the circular groove and is provided with a toggle hook that matches the convex bars.

2. The industrial and mining lamp according to claim 1, wherein the convex ring comprises a large circular ring provided on an outer side and a small circular ring provided on an inner side, a center of the small circular ring is provided with a second hole that matches the screw, one end of the small circular ring near the connector is provided with a first placement groove, the iron ring is provided in the first placement groove, a side of the small circular ring is provided with a second placement groove, the toggle hook is provided on the second placement groove.

3. The industrial and mining lamp according to claim 2, wherein one end of the screw near the end cover is provided with a screw head, the screw head is provided on one side of the limit ring away from a connection block, one end of the screw away from the end cover passes through the second hole and is provided in the lamp, one side of a lamp housing away from the connector is provided with a bolt, the bolt is sleeved on the screw.

4. The industrial and mining lamp according to claim 1, wherein thirty-six convex bars are provided, the thirty-six convex bars divide the circular groove into thirty-six movable areas, an angle of each movable area is 10°.

5. The industrial and mining lamp according to claim 3, wherein cross-sections of the first hole, the second hole, and the screw are a closed pattern that is connected by two straight lines and two circular arcs in a staggered manner.

6. The industrial and mining lamp according to claim 1, wherein the lamp comprises the lamp housing, a base plate, a light source board, and a lamp cover provided at the two longitudinal ends of the lamp, the light source board is provided between the lamp housing and the base plate, the convex ring is provided at one end of the lamp cover away from the lamp housing.

7. The industrial and mining lamp according to claim 1, wherein the lamp frame comprises a frame body, a top plate, and a drive component, the drive component is provided between the frame body and the top plate, two longitudinal ends of the frame body are fixed on the end cover.

* * * * *